(12) United States Patent
Yokoi et al.

(10) Patent No.: US 11,448,942 B2
(45) Date of Patent: Sep. 20, 2022

(54) ROTATIONAL MECHANISM AND APPARATUS INCLUDING THE SAME

(71) Applicant: CANON KABUSHIKI KAISHA, Tokyo (JP)

(72) Inventors: Takeaki Yokoi, Kawasaki (JP); Tomonori Nakazawa, Chigasaki (JP); Jun Kawata, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 16/663,641

(22) Filed: Oct. 25, 2019

(65) Prior Publication Data

US 2020/0133100 A1 Apr. 30, 2020

(30) Foreign Application Priority Data

Oct. 31, 2018 (JP) .............................. JP2018-205867
Sep. 18, 2019 (JP) .............................. JP2019-169245

(51) Int. Cl.
| | |
|---|---|
| *G03B 17/56* | (2021.01) |
| *F16M 11/12* | (2006.01) |
| *F16M 11/18* | (2006.01) |
| *F16C 19/54* | (2006.01) |
| *F16M 11/04* | (2006.01) |
| *F16M 11/10* | (2006.01) |

(Continued)

(52) U.S. Cl.
CPC ............ *G03B 17/561* (2013.01); *F16C 19/54* (2013.01); *F16M 11/04* (2013.01); *F16M 11/10* (2013.01); *F16M 11/12* (2013.01); *F16M 11/126* (2013.01); *F16M 11/18* (2013.01); *F16H 1/20* (2013.01); *F16H 57/027* (2013.01); *F16H 57/0416* (2013.01); *F16H 2057/02026* (2013.01); *F16H 2057/02039* (2013.01)

(58) Field of Classification Search
CPC ........ G03B 17/56; F16M 11/04; F16M 11/10; F16M 11/12; F16M 11/18
USPC .......................................... 396/428
See application file for complete search history.

(56) References Cited

U.S. PATENT DOCUMENTS 4,172,621 A * 10/1979 Yoshida .................. B60B 27/00
  29/725
4,352,528 A * 10/1982 Guimbretiere .......... B60B 35/18
  180/258

(Continued)

FOREIGN PATENT DOCUMENTS

CN 104797364 A 7/2015
CN 205499043 U 8/2016

(Continued)

*Primary Examiner* — Clayton E. LaBalle
*Assistant Examiner* — Kevin C Butler
(74) *Attorney, Agent, or Firm* — Canon U.S.A., Inc. I.P. Division (57) ABSTRACT

A rotational mechanism includes a frame, a plurality of rotational units, an inner ring rotatably supported on the frame via the plurality of rotational units, and a rotation driving unit configured to generate power for rotating the inner ring. The inner ring is provided with a protrusion portion on an outer periphery. Each of the plurality of rotational units includes two bearings and a first pressing unit. The first pressing unit is configured to apply pressing forces to the two bearings in opposite directions in a rotational axis direction of the inner race. The protrusion portion is held between the two bearings due to the pressing forces.

15 Claims, 10 Drawing Sheets

(51) Int. Cl.
    *F16H 1/20*      (2006.01)
    *F16H 57/02*     (2012.01)
    *F16H 57/027*    (2012.01)
    *F16H 57/04*     (2010.01)

(56) References Cited

U.S. PATENT DOCUMENTS

| | | | |
|---|---|---|---|
| 4,404,876 A | 9/1983 | Eckel | |
| 6,301,447 B1* | 10/2001 | Jackson | G03B 17/561 |
| | | | 348/50 |
| 2009/0179127 A1* | 7/2009 | Pettey | F16M 11/18 |
| | | | 248/276.1 |
| 2014/0004992 A1* | 1/2014 | Weist | F03D 15/00 |
| | | | 475/331 |
| 2014/0226963 A1* | 8/2014 | Ryan | F16M 11/32 |
| | | | 396/428 |
| 2017/0324941 A1* | 11/2017 | Birkler | H04N 5/23238 |
| 2018/0024422 A1* | 1/2018 | Ye | F16M 11/2021 |
| | | | 396/428 |
| 2019/0301524 A1* | 10/2019 | Lim | F16H 19/04 |
| 2020/0067382 A1* | 2/2020 | Yan | F16H 1/28 |
| 2020/0133100 A1* | 4/2020 | Yokoi | F16C 19/54 |

FOREIGN PATENT DOCUMENTS

| | | | | |
|---|---|---|---|---|
| JP | 2002235740 | * | 8/2002 | ............ F16C 19/16 |
| JP | 2002235740 A | | 8/2002 | |
| JP | 2017015196 | * | 1/2017 | ............ F16C 19/16 |
| JP | 2017015196 A | | 1/2017 | |
| JP | 2018107786 A | | 7/2018 | |
| KR | 10-2018-0007417 A | | 1/2018 | |
| KR | 20180007417 | * | 1/2018 | ............ F16C 19/08 |

* cited by examiner

ROTATIONAL MECHANISM AND APPARATUS INCLUDING THE SAME

BACKGROUND OF THE DISCLOSURE

Field of the Disclosure

The present disclosure relates to a rotational mechanism mounted on various kinds of apparatuses such as a camera platform apparatus, and an apparatus including such a rotational mechanism.

Description of the Related Art

Conventionally, there has been proposed a rotational mechanism using a plurality of annularly disposed balls regarding a bearing structure of a pan/tilt driving shaft of a camera platform apparatus.

Japanese Patent Application Laid-Open No. 2018-107786 discusses an imaging apparatus including a rotational unit that supports a camera unit in such a way that the camera unit can be tilted and rotated and supports a fixed unit that supports the rotational unit in such a way that the rotational unit is panned and rotated. The imaging apparatus is configured to include, between the rotational unit and the fixed unit, a plurality of annularly disposed balls, a holder holding the balls, and an elastic member that presses the rotational unit toward the fixed unit on an inner side with respect to the plurality of balls in a direction perpendicular to a pan rotational axis.

The configuration of the above-described rotational mechanism is effective for, for example, a monitoring apparatus including a small-sized imaging apparatus mounted thereon. This configuration, however, may make manufacturing thereof difficult depending on a size of the rotational mechanism.

SUMMARY OF THE DISCLOSURE

According to an aspect of the present disclosure, a rotational mechanism includes a frame, a plurality of rotational units, an inner ring rotatably supported on the frame via the plurality of rotational units, and a rotation driving unit configured to generate power for rotating the inner ring. The inner ring is provided with a protrusion portion on an outer periphery. Each of the plurality of rotational units includes two bearings and a first pressing unit. The first pressing unit is configured to apply pressing forces to the two bearings in opposite directions in a rotational axis direction of the inner ring. The protrusion portion is held between the two bearings due to the pressing forces.

Further features and aspects of the present disclosure will become apparent from the following description of example embodiments (with reference to the attached drawings).

DESCRIPTION OF THE EMBODIMENTS

Example embodiments of the present disclosure will be described in detail with reference to the accompanying drawings.

In a camera platform apparatus for use in still image capturing based on a remote manipulation, especially a rotational mechanism (a rotator) that rotates an imaging device around an optical axis thereof cannot fulfill a function unless a rotatable movable unit and a fixed unit are larger than an outer circumference of the imaging device to be mounted on the rotational mechanism. This inevitably leads to a necessity of increasing a size of the movable unit. However, in the case of the rotational mechanism discussed in Japanese Patent Application Laid-Open No. 2018-107786, the increase in the size of the movable unit raises a level of difficulty in manufacturing the mechanism for evenly pressing the movable unit toward the fixed unit. This is because, for example, dimensions of components and a surface property should be managed with high precision to realize the mechanism capable of evenly pressing the movable unit. Nevertheless, omission of the pressing mechanism results in a backlash remaining in a thrust direction (an axial direction), thereby causing a rotational axis to wobble due to the backlash in the thrust direction at the time of tilt driving or rotation driving, and undesirably affecting operational accuracy of the imaging. In the following example embodiments, a camera platform apparatus including a rotational mechanism with a different configuration from that of the rotational mechanism discussed in Japanese Patent Application Laid-Open No. 2018-107786 is to be described.

Figure 1:
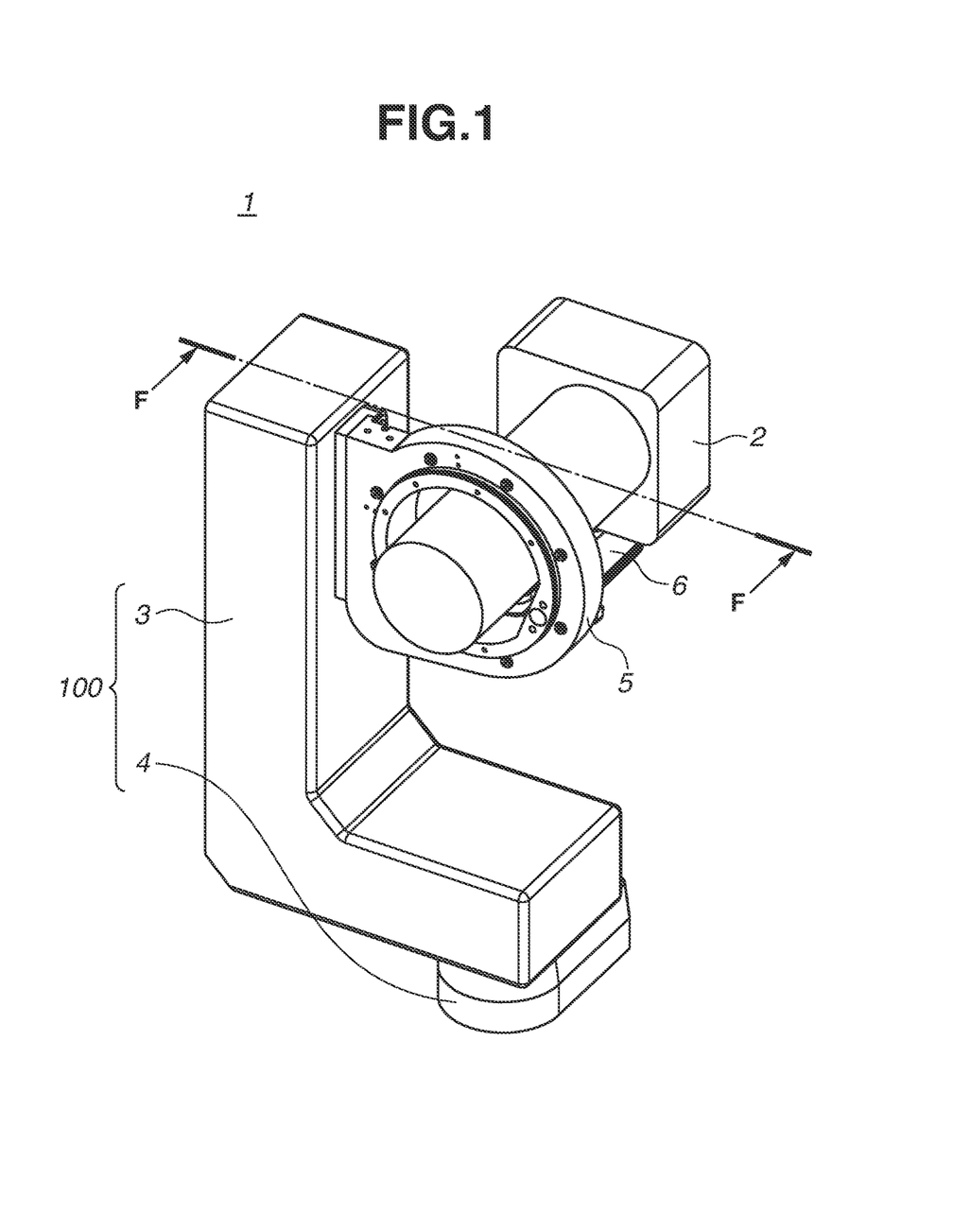
FIG. 1 is a perspective view of a camera platform apparatus according to a first example embodiment.

FIG. 1 is a perspective view of a camera platform apparatus according to a first example embodiment. A front view is defined as a view seen from a lens, and a back view is defined as a view seen from an opposite side of the lens. FIG. 1 is a perspective view of the front side.

A camera platform apparatus (a camera platform system) 1 includes an imaging device 2, a camera platform 100, a rotator (a rotational mechanism) 5, and a camera stand 6, and pan-drives, tilt-drives, and rotation-drives the imaging device 2 fixed on the camera stand 6.

The imaging device 2 includes a lens, a camera main body, and the like, and is fixed on the rotator (the rotational mechanism 5) via the camera stand 6.

The camera platform 100 includes a head 3 and a base 4, and drives the imaging device 2 in pan and tilt directions. The camera platform 100 and the rotator 5 are connected to each other, and pan-drive, tilt-drive, and rotation-drive the imaging device 2 fixed on the camera stand 6.

The head 3 is coupled with the base 4, and is rotatable in the pan direction. A tilt driving unit 8 for tilt-driving the rotator 5 and a pan driving unit 9 for pan-driving the head 3 are stored inside the head 3 of the camera platform apparatus 1. The tilt driving unit 8 and the pan driving unit 9 generate heat due to the driving, and a heat release structure for efficiently ventilating this heat will be described with reference to FIGS. 2A and 2B.

Figure 2A:
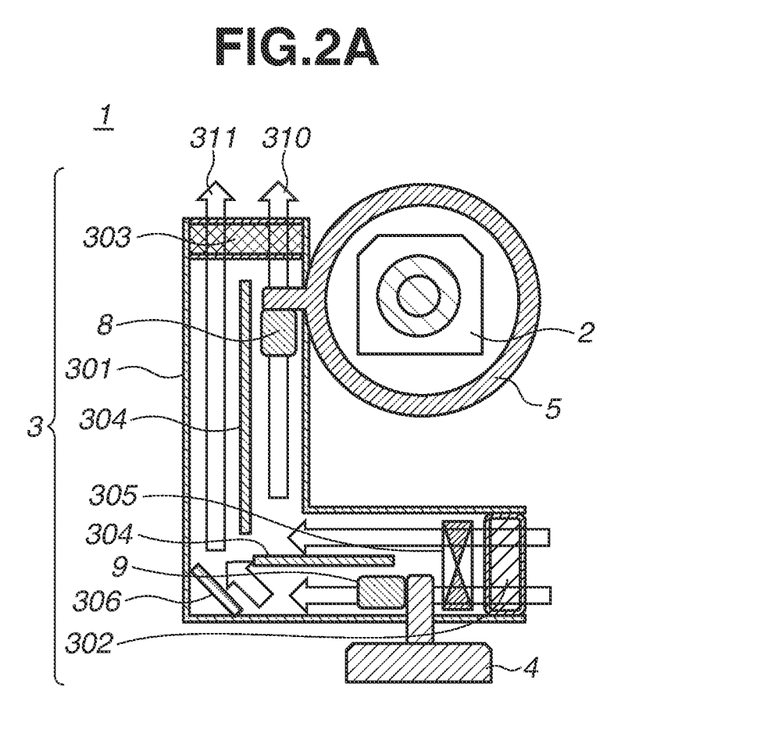
FIG. 2A is a cross-sectional view of the camera platform apparatus illustrated in FIG. 1 taken along a line F-F.
Figure 2B:
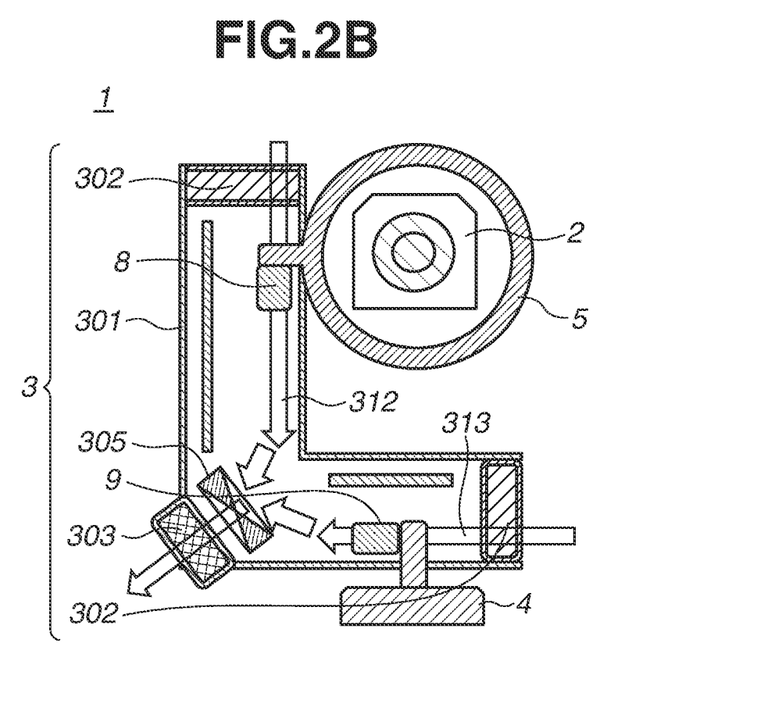
FIG. 2B is a cross-sectional view of the camera platform apparatus illustrated in FIG. 1 taken along the line F-F.

FIGS. 2A and 2B each illustrate a cross-sectional view of the camera platform apparatus 1 illustrated in FIG. 1 taken along a line F-F.

The head 3 according to the present example embodiment is structured to house the tilt driving unit 8 and the pan driving unit 9 in a casing 301. The head 3 includes an intake unit 302 and an exhaust unit 303 at end portions of the casing 301 and a fan 305 at a predetermined position as illustrated in FIG. 2A, and is structured to ventilate and release the heat generated at the tilt driving unit 8 and the pan driving unit 9. A partition member 304 is provided in the casing 301 to allow heat released from a heat release flow path of the tilt driving unit 8 and heat released from a heat release flow path of the pan driving unit 9 to flow through different ventilation paths 310 and 311, respectively. As a result of this arrangement in the head 3, the heat generated at one of the driving units 8 and 9 does not easily raise a temperature in a ventilation path of the other of the driving units 8 and 9, and the two driving units 8 and 9 can be efficiently cooled. A partition member 306 is disposed to be inclined at a corner of the casing 301. Since the partition member 306 is provided, generation of a vortex that otherwise might be generated at the corner can be prevented, and as a result, a ventilation amount is increased and the heat release efficiency is improved. The partition member 304 is also disposed so that no corner is formed in order to increase the ventilation amount.

The partition member 304 and the partition member 306 may be circuit boards. The head 3 may also be formed in an L-like shape in which the tilt driving unit 8 and the pan driving unit 9 are disposed in proximity to the both ends of the casing 301 as illustrated in FIG. 2B. In this case, effects similar to the configuration illustrated in FIG. 2A can be achieved by providing the exhaust unit 303 and the fan 305 at the corner of the casing 301 and the intake unit 302 at each of the both ends of the L-like shaped casing 301 to form two ventilation paths 312 and 313.

The camera platform apparatus 1 is designed to be waterproofed and bug-proofed for outdoor use. To make waterproof the camera platform apparatus 1 that ventilates the inside of the casing 301 of the head 3 to release the heat in the above-described manner, a waterproof structure 700 is provided at an intake port (not illustrated) and an exhaust port (not illustrated), which are opening portions for the ventilation of the casing 301. The intake unit 302 and the exhaust unit 303 illustrated in FIGS. 2A and 2B each include the waterproof structure 700 provided at the intake port or the exhaust port.

Figure 3A:
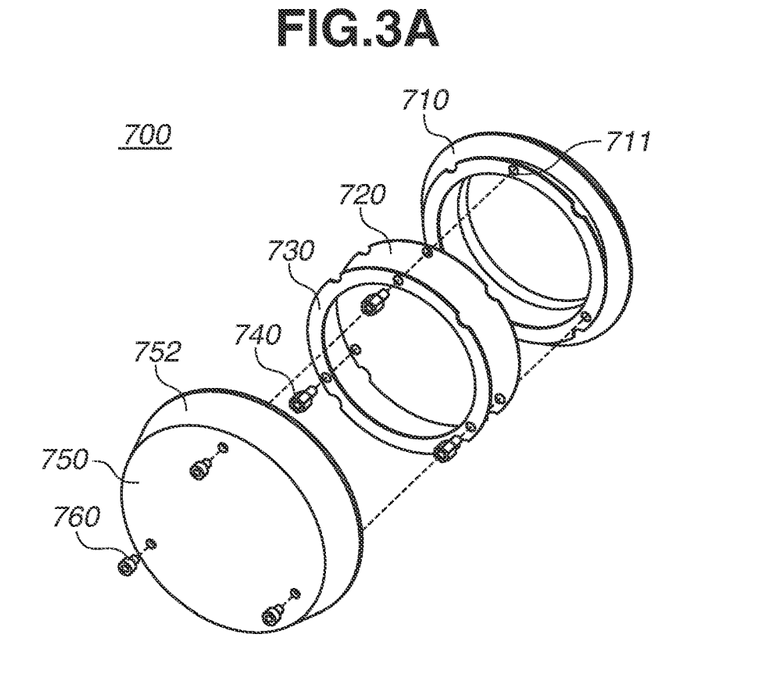
FIG. 3A illustrates a waterproof structure according to the first example embodiment.
Figure 3B:
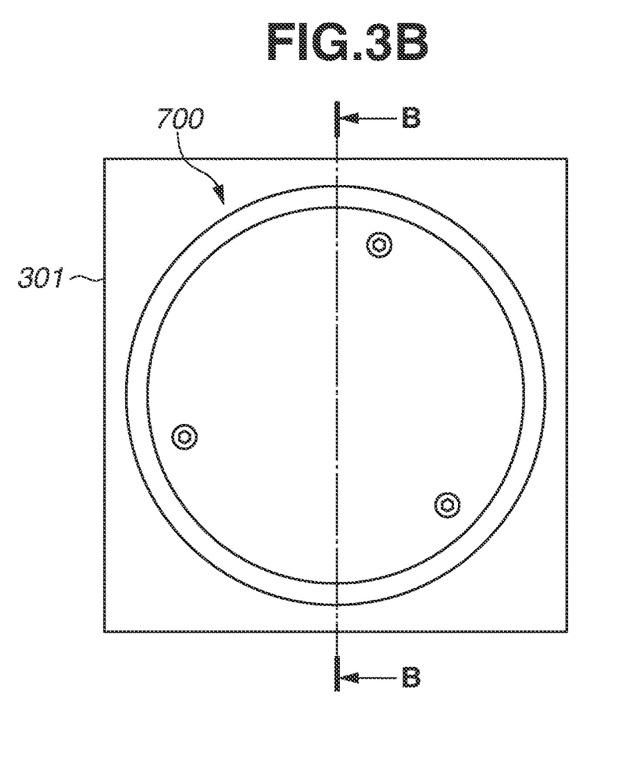
FIG. 3B illustrates the waterproof structure according to the first example embodiment.
Figure 3C:
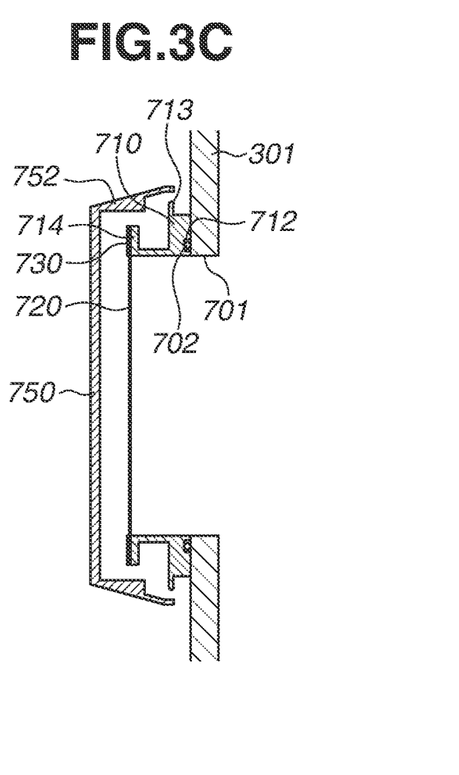
FIG. 3C illustrates the waterproof structure according to the first example embodiment.

FIG. 3A illustrates an exploded perspective view of the waterproof structure 700. FIG. 3B illustrates a front view with the waterproof structure 700 installed on the casing 301. FIG. 3C illustrates a cross-sectional view taken along a line B-B in FIG. 3B.

The waterproof structure 700 includes a protrusion unit 710, a bug-proof mesh 720, a mesh holding plate 730, and a cover member 750 in this order from an inner side to an outer side, assuming that the casing 301 is the inner side.

The protrusion unit 710 is fixed to the casing 301 with a screw or the like, and protrudes from the casing 301 in a direction toward the cover member 750 (outward). The protrusion unit 710 includes an opening to communicate with an opening 701 included in the casing 301, and a groove 712 is formed on an outer periphery of the protrusion unit 710 with a waterproof packing 702 provided in this groove 712. The waterproof packing 702 prevents a water droplet from entering into the opening 701 as the waterproof packing 702 is disposed to surround the outer periphery of the opening 701. The protrusion unit 710 is circular in cross section, and waterproof frames 713 and 714 extending toward an outer peripheral direction of the opening 701 are provided on a side surface and a top surface, respectively, of the protrusion unit 710 protruding toward the cover member 750. The bug-proof mesh 720 is disposed to cover the opening portion of the protrusion unit 710. The mesh holding plate 730 is fixed to female screws 711 provided on the waterproof frame 714 with hexagonal spacer screws 740, and the bug-proof mesh 720 is held between the mesh holding plate 730 and the waterproof frame 714 at this time. The cover member 750 includes a side wall 752 extending toward the casing 301, and has a tapering shape to spread out toward the casing 301. The cover member 750 is disposed to cover the protrusion unit 710 and also cover the waterproof frames 713 and 714 from the outer periphery due to the tapering shape of the cover member 750. Because of the presence of the side wall 752 extending with inclination to the casing 301, an attachment surface of the cover member 750 is smaller than a surface of the casing 301 on which the protrusion unit 710 is attached. Therefore, the present configuration is expected to impede entry of water into the opening portion of the casing 301. The cover member 750 is fastened to a female screw of the hexagonal spacer screws 740 with the screws 760. Predetermined spaces are provided between the cover member 750 and the protrusion unit 710 and between the cover member 750 and the casing 301 for ventilation.

Rain is not directly blown into the opening 701 with the aid of the above-described waterproof structure 700. Even when water enters the space between the cover member 750 and the casing 301, the water is held back by the waterproof frames 713 and 714, and flows down along an outer side of the protrusion unit 710 to be discharged outward from the casing 301.

Figure 4A:
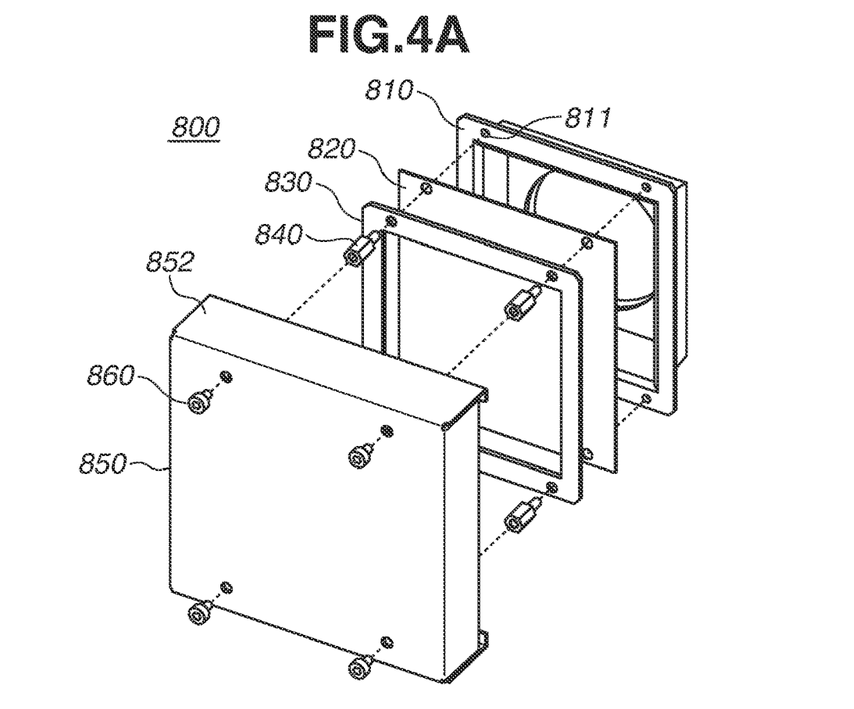
FIG. 4A illustrates a waterproof structure according to the first example embodiment.
Figure 4B:
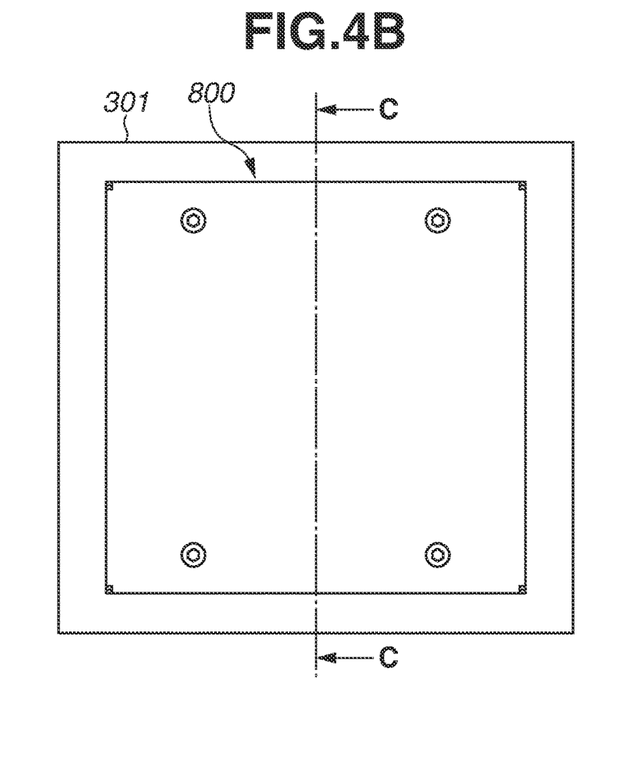
FIG. 4B illustrates the waterproof structure according to the first example embodiment.
Figure 4C:
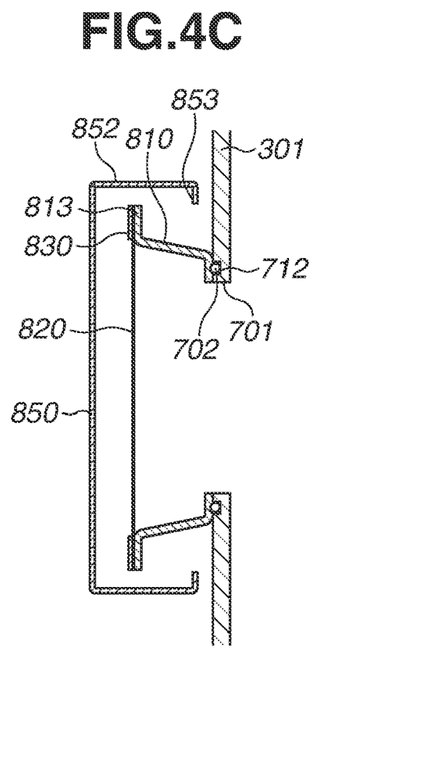
FIG. 4C illustrates the waterproof structure according to the first example embodiment.

The waterproof structure may be configured in another manner, like an example illustrated in FIGS. 4A to 4C. FIG. 4A is an exploded perspective view of a waterproof structure 800, which is another possible configuration. FIG. 4B is a front view of the waterproof structure 800 installed on the casing 301. FIG. 4C is a cross-sectional view taken along a line C-C in FIG. 4B. The opening 701, the waterproof packing 702, and the groove 712 refer to the same components as those illustrated in FIGS. 7A to 7C. A mesh holding plate 830, a cover member 850, and hexagonal spacer screws 840 and screws 860 correspond to the mesh holding plate 730, the cover member 750, and the hexagonal spacer screws 740 and the screws 760, respectively, and descriptions thereof will be omitted below.

Differences from the waterproof structure 700 will be described now. A protrusion unit 810 protrudes toward the cover member 850, and includes a waterproof frame 813 having a top surface extending in a direction toward the outer periphery of the opening 701. The protrusion unit 810 has a tapering shape to spread out with an inclination from the casing 301 toward the cover member 850. The cover member 850 is disposed to cover an end of the protrusion unit 810 near the cover member 850 and also cover the waterproof frame 813 from an outer periphery with a side wall 852 extending from the cover member 850 to the casing 301. A waterproof rib 853 extending toward the opening of the casing 301 is provided at an end of the side wall 852. In the waterproof structure 800, the waterproof rib 853 limits a direction in which a water droplet can enter a space between the cover member 850 and the casing 301. When the water droplet enters the space, the water droplet is held back by the inclined surface and the waterproof frame 813 of the protrusion unit 810, and is discharged outward from the casing 301. The protrusion unit 810 has the inclined tapering shape, which allows the bug-proof mesh 820 to be opened over a wide area, thereby allowing a further wide area to be used for the ventilation.

The waterproof structure 700 or 800 configured in the above-described manner is provided at each of the intake unit 302 and the exhaust unit 303, and as a result water and bugs are prevented from entering inside the casing 301 regardless of an installation orientation of the camera platform apparatus 1, and also a sufficient ventilation area is secured to efficiently release the heat.

The base 4 is fastened to a mount or the like with a not-illustrated bolt or the like, and is coupled with the head 3 as components of the camera platform 100.

Figure 5A:
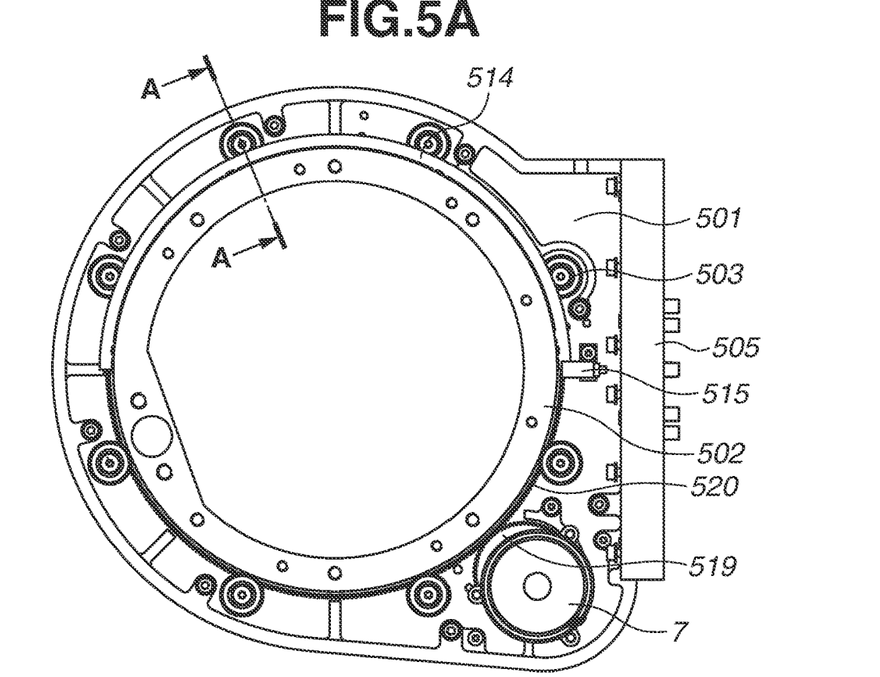
FIG. 5A illustrates a rotator according to the first example embodiment as viewed from a back surface.
Figure 5B:
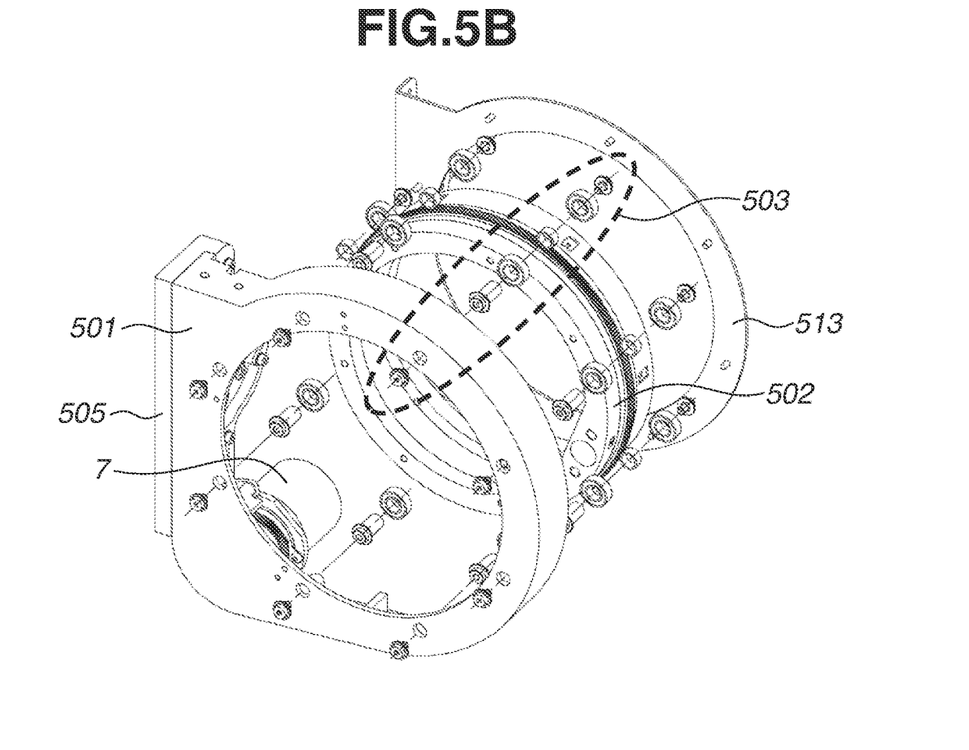
FIG. 5B is an exploded perspective view of the rotator according to the first example embodiment.
Figure 5C:
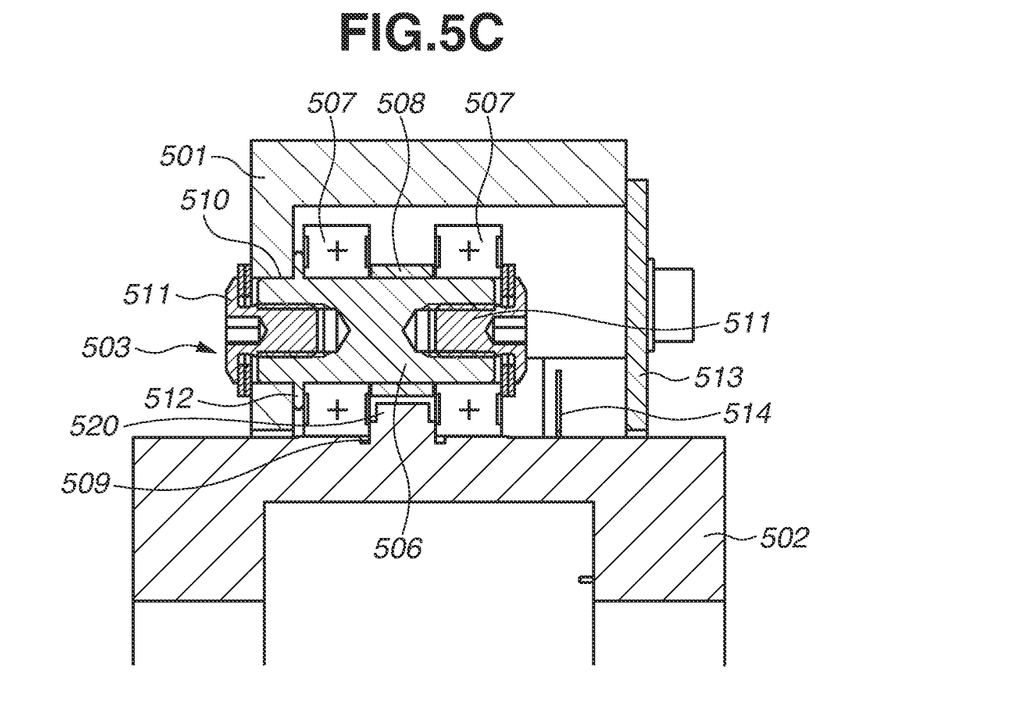
FIG. 5C is a cross-sectional view of the rotator according to the first example embodiment.
Figure 5D:
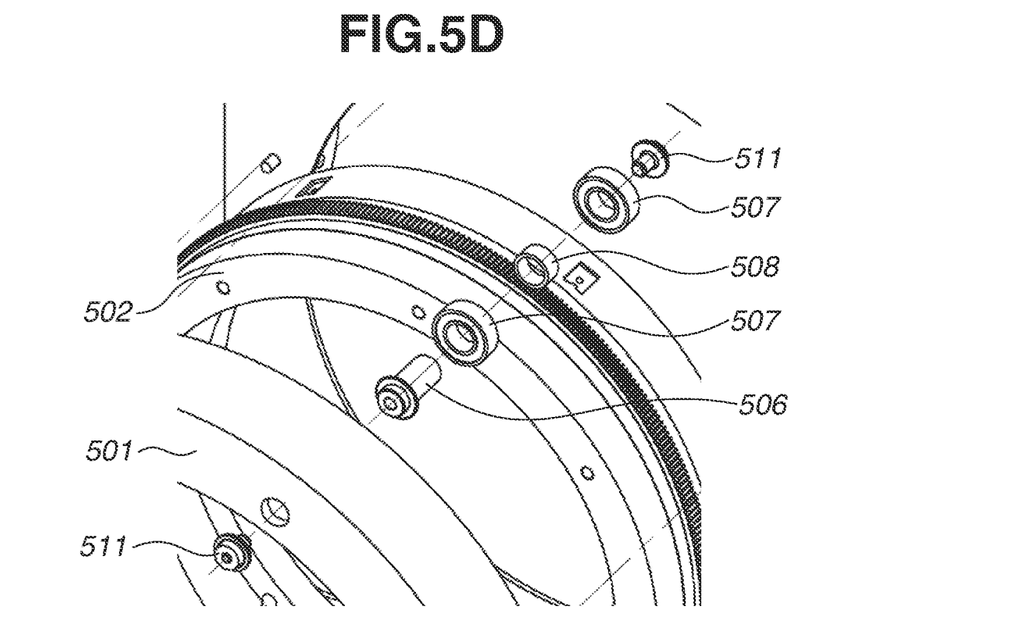
FIG. 5D is an exploded perspective view of the rotator according to the first example embodiment.

The rotator 5 will be described with reference to FIGS. 5A to 5D. FIG. 5A illustrates the rotator 5 according to the present example embodiment as viewed from the back surface in FIG. 1, and illustrates the rotator 5 with a cover 513 removed therefrom. FIG. 5B is an exploded perspective view of the rotator 5 according to the present example embodiment. FIG. 5C is a cross-sectional view taken along a line A-A in FIG. 5A, and FIG. 5D is an exploded perspective view of a bearing unit 503.

A rotation driving unit 7 for rotationally driving the imaging device 2 fixed on the camera stand 6 is housed inside the rotator 5, and the imaging device 2 is rotatable around the optical axis along with a rotation of the rotator 5. The rotator 5 is supported by the head 3, and is rotatable in the tilt direction.

The rotator 5 includes a frame 501, bearing units (rotational units) 503, an inner ring 502, and the rotation driving unit 7. A plurality of bearing units 503 is disposed along a circumference, and the inner ring 502 is rotatably supported on the frame 501 via the plurality of bearing units 503. The rotation driving unit 7 generates power for rotating the inner ring 502. The plurality of bearing units 503 is disposed line-symmetrically with respect to a tilt axis in FIGS. 5A and 5B, but the arrangement of the bearing units 503 is not limited to the above arrangement. It is desirable that the bearing units 503 are arranged at intervals with small variations, because the inner ring 502 can be evenly held by the plurality of bearing units 503 if the plurality of bearing units 503 is arranged at approximately even intervals along the circumference.

The power generated from the rotation driving unit 7 is transmitted to a gear (a second power transmission mechanism) 520 via a not-illustrated speed reducer and a gear (a first power transmission mechanism) 519 connected to the rotation driving unit 7 to transmit the power. The rotatably supported inner ring 502 can be rotated by the transmitted power and the bearing units 503.

The gear 520 according to the present example embodiment is provided at a flange (a protrusion portion) 509 disposed on an outer periphery of the inner ring 502. Owing to this configuration, the rotator 5 itself can be thinner in the thrust direction and the rotator 5 can fulfill its function in a smaller space, compared to when the gear is disposed at another position.

A blade 514 is connected to a half part of the outer periphery of the inner ring 502, and is rotated together with the inner ring 502. An end of the blade 514 passes through a photointerrupter 515 provided at the frame 501, to detect a rotational origin. The blade 514 is disposed behind the bearing units 503 to avoid interference with the bearing units 503.

An attachment plate 505 is connected with a not-illustrated screw in such a manner that a part of the attachment plate 505 is in contact with a tilt axis of the head 3 illustrated in FIG. 1, and is rotatable in the tilt direction.

FIG. 5B is the exploded perspective view of the rotator 5. The rotator 5 is provided in such a manner that the inner ring 502 is rotatably coupled with the frame 501 via the bearing units 503, and, further, the cover 513 is attached to a surface opposite to a surface of the inner ring 502 that faces the frame 501.

The bearing units 503 will be described in further detail. As illustrated in FIGS. 5C and 5D, each of the bearing units 503 includes a shaft 506, two bearings 507 into which the shaft 506 is inserted, a spacer (an adjustment unit) 508 disposed between the two bearings 507, and screws (a first pressing unit) 511 to which pressing forces are to be applied.

The shaft 506 is fitted in a hole 510 formed in the frame 501, positioned in the thrust direction by a flange (a regulation unit) 512, and fixed to the frame 501 by the pressing forces (axial forces) derived from fastening with the screws 511 serving as the pressing unit. In this case, the hole 510 may be formed as a radially elongated hole, and be configured to radially adjust a position of the shaft 506. The flange 512 for use in positioning the shaft 506 in the thrust direction is formed integrally with the shaft 506 in the present example embodiment, but may be another unit capable of positioning the shaft 506 in the thrust direction (for example, an E-ring).

Figure 9A:
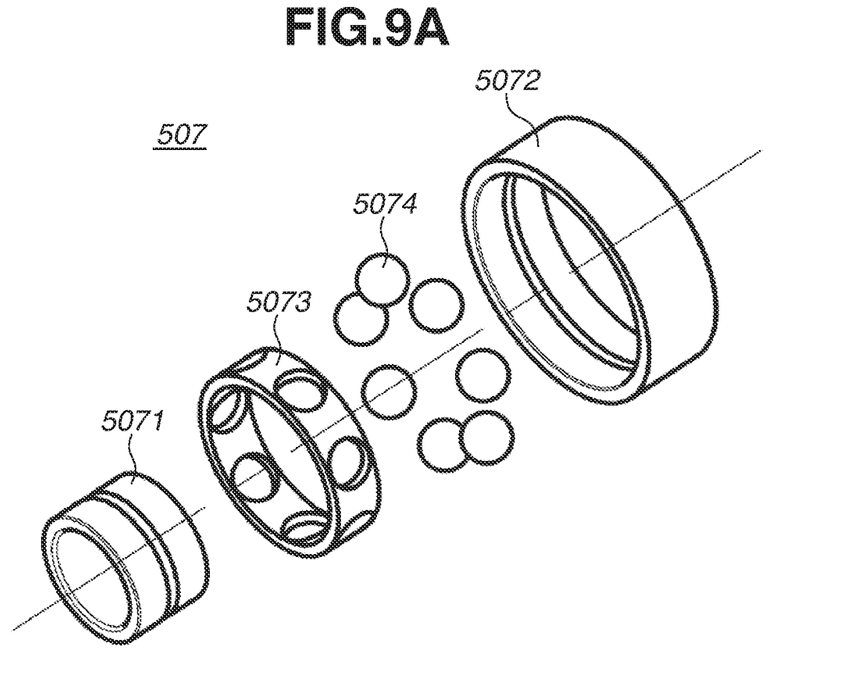
FIG. 9A is an exploded perspective view of a bearing.
Figure 9B:
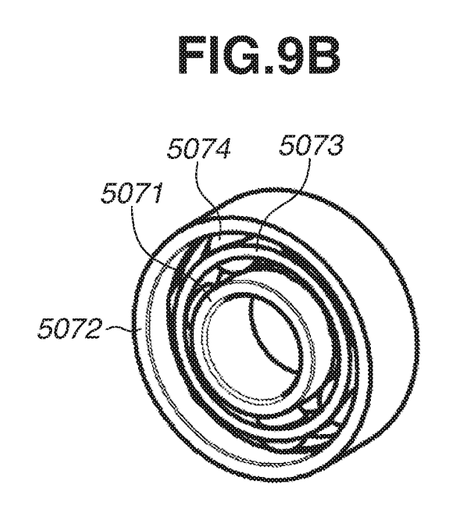
FIG. 9B is an enlarged view of the bearing.
Figure 9C:
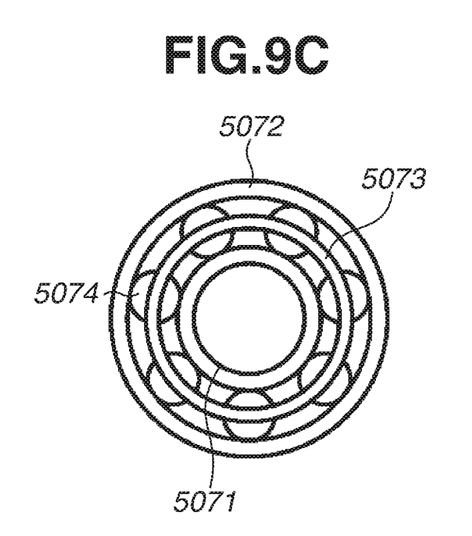
FIG. 9C is an enlarged view of the bearing.

Each of the bearings 507 is a roller bearing, and supports a rotation of the shaft 506. A configuration of the bearing 507 will be described with reference to FIGS. 9A to 9C. FIG. 9A is an exploded perspective view of the bearing 507, and FIGS. 9B and 9C illustrate a perspective view and a front view, respectively, of the bearing 507 having been assembled. The bearing 507 includes an inner race 5071, an outer race 5072, a bearing ring (a holder) 5073, and a plurality of balls (rolling members) 5074. The bearing ring 5073 is disposed between the inner race 5071 and the outer race 5072 so that the plurality of balls 5074 is not to come into contact with each other. The rolling members are the balls in the present example embodiment, but may be other rolling members such as rollers. In the present example embodiment, the shaft 506 is inserted in the two bearings 507, and the spacer 508 is inserted between the two bearings 507.

The spacer 508 is held between the two bearings 507 to which the pressing forces of the screws 511 are to be applied in opposite directions in a rotational axis direction of the rotator 5, and the flange 509 of the inner ring 502 is also held between the two bearings 507 to which the pressing forces of the screws 511 are to be applied. An axial length of the spacer 508 is shorter than an axial length of the flange 509, and the flange 509 is held between the two bearings 507 with the aid of the pressure application for holding the spacer 508. At this time, the two bearings 507 play a role of supporting the rotation of the shaft 506 at each of the bearings 507 and a role of holding the flange 509 of the inner ring 502 between the two bearings 507 in the opposite directions in the rotational axis direction of the rotator 5.

In addition, curved surfaces of the outer races 5072 of the two bearings 507 are in contact with the inner ring 502.

In the present example embodiment, the two bearings 507 are biased when the two bearings are pressed as a result of the fastening with the screws 511, and the two bearings 507 hold the flange 509 therebetween. The two bearings 507, however, may be biased by a pressure using another pressing method such as press-fitting so that the two bearings 507 can also hold the flange 509 therebetween. In the present example embodiment, it is desirable that the bearings 507 are fastened with the screws 511 so that the pressing forces are applied to the bearings 507.

The spacer (the adjustment unit) 508 according to the present example embodiment may be replaced with a structure such as a step formed on the shaft 506. Then, the length of the spacer 508 in the rotational axis direction (the thrust direction) is shorter than the length of the flange 509 in the rotational axis direction. A difference between the lengths of the spacer 508 and the flange 509 in the rotational axis direction falls within a range that does not exceed a thrust backlash amount with respect to the inner races 5071 (the outer races 5072) of the two bearings 507 when the bearing outer races 5072 (the inner races 5071) thereof are held. Application of an excessive axial force to the bearings 507 is avoided by setting this range.

In this case, the thrust backlash amount of the bearing inner races 5071 (or the outer races 5072) depends on the bearings 507 in use.

From the above-described reason, the pressures are applied to the bearings 507 in one direction and a direction opposite to the one direction in the axial direction, so that the rotator 5 can be rotated with a thrust backlash component for the inner ring 502 relative to the frame 501 removed.

In the rotator 5 according to the present example embodiment, the pressure to be applied can be set for the plurality of bearing units 503 one by one. Therefore, the present example embodiment eliminates the necessity of managing surface roughness and a dimension of a large component, and can realize the function with a low level of difficulty in manufacturing the rotator 5, compared to the pressure application method using the retainer ring larger than the outer periphery of the inner ring 502.

Figure 6:
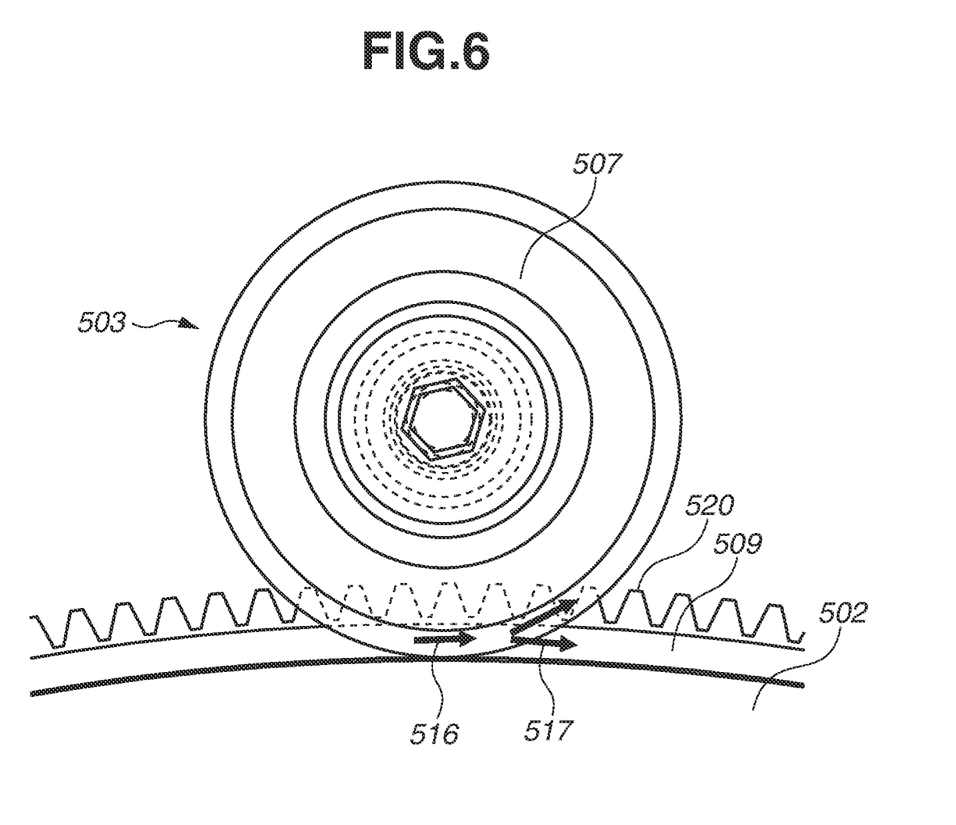
FIG. 6 is an enlarged view of a bearing unit of the rotator according to a second example embodiment.

FIG. 6 is an enlarged view of the bearing unit 503 of the rotator 5 according to a second example embodiment, and illustrates a relationship between the bearing unit 503 and the flange 509 of the inner ring 502. In a case where the inner ring 502 is rotated in the clockwise direction, the bearing 507 and the flange 509 are moved in the same direction as each other in a circumferential direction indicated by an arrow 516 at a point where the bearing 507 and the flange 509 are in contact with each other. However, beyond the point where the bearing 507 and the inner ring 502 (the flange 509) are in contact with each other, a difference is generated between movement directions 517 of a side surface of the bearing 507 (a surface to hold the flange 509) and a side surface of the flange 509 (a surface held by the bearing 507). As a result, sliding motions occur on surfaces of the two bearings 507 that hold the flange 509 and surfaces of the flange 509 held by the two bearings 507, and the surfaces on which the sliding motions occur is worn. The sliding motions on the side surfaces of the bearings 507 and the side surfaces of the flange 509 do not cause much of a problem during a low-speed and low-load rotation, but an increase in a load may cause the wear of the side surfaces on which the sliding motions occur and negatively affect the operation. Therefore, in the present example embodiment, sliding washers (wear reduction units) 518 are disposed between one of the two bearings 507 and the spacer 508 and between the other of the two bearings 507 and the spacer 508, so that the sliding wear can be reduced between the side surfaces of the bearings 507 and the side surfaces of the flange 509. The rotator 5 according to the present example embodiment is configured in a similar manner to the rotator 5 according to the first example embodiment except for including the sliding washers 518, and therefore a detailed description thereof will be omitted here.

Figure 7A:
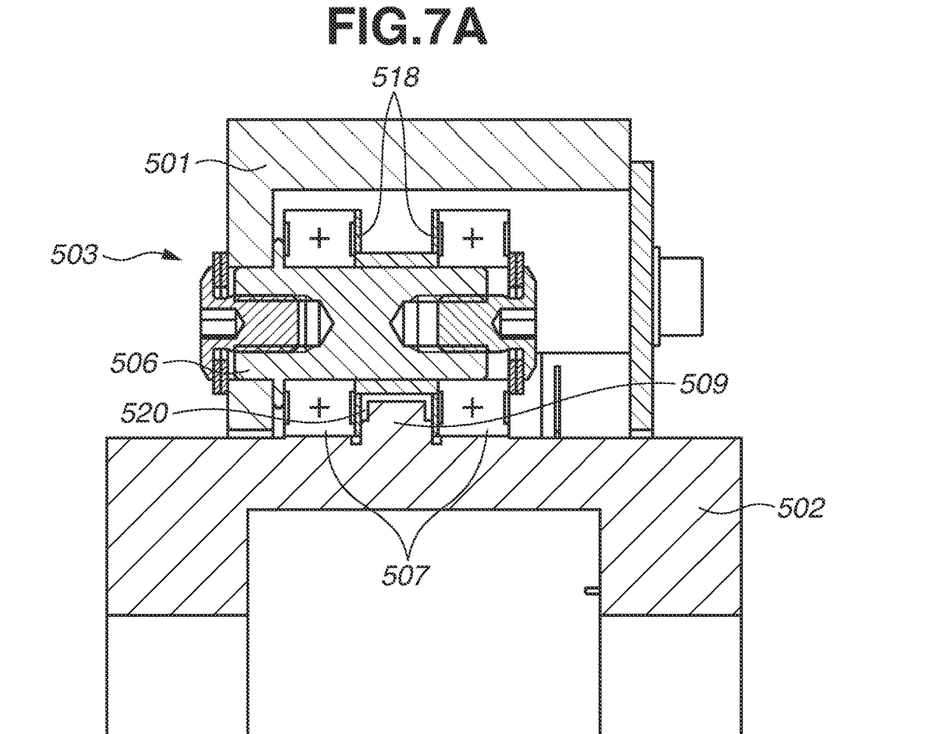
FIG. 7A is a cross-sectional view of the bearing unit according to the second example embodiment.
Figure 7B:
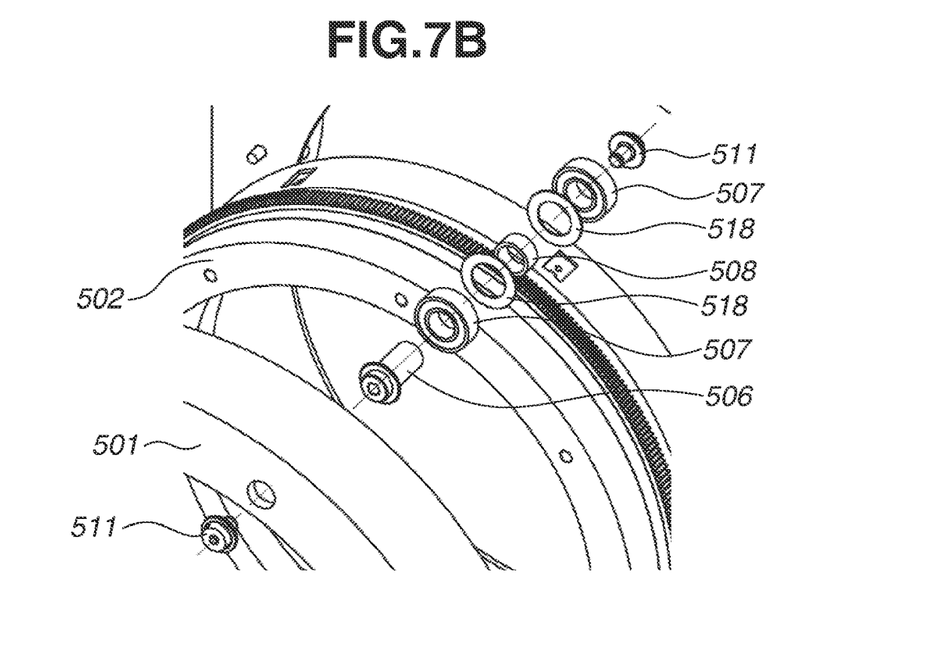
FIG. 7B is an exploded perspective view of the bearing unit according to the second example embodiment.

FIGS. 7A and 7B illustrate the bearing unit 503 according to the present example embodiment. A back view of the rotator 5 according to the present example embodiment is similar to FIG. 5A, and therefore is omitted herein. FIG. 7A is a cross-sectional view of the rotator 5, and illustrates a cross section taken along the line A-A in FIG. 5A similarly to FIG. 5C in the first example embodiment. FIG. 7B is an exploded perspective view of the bearing unit 503. The bearing unit 503 is configured in a similar manner to the first example embodiment described with reference to FIGS. 5C and 5D except for the sliding washers 518 held between the spacer 508 and the bearings 507. The shaft 506 is inserted in the ring-shaped sliding washers 518 and the bearings 507, and the sliding washers 518 is rotated together with the bearings 507. At this time, the spacer 508 and the flange 509 are held between the sliding washers 518 to which the pressing forces are applied as a result of the fastening with the screws 511 serving as the pressing unit. Owing to this configuration, the rotator 5 can reduce the friction between the side surfaces of the bearings 507 and the side surfaces of the flange 509, thereby avoiding an operational failure due to the sliding wear. In this case, a resin washer is used as the sliding washer, but another highly slidable metallic member, a lubricant such as grease, or the like may be used. In the present example embodiment, the resin washer is desirable.

In the above-described first and second example embodiments, the rotator 5 has been described referring to the example in which the flange 509 is held between the coaxially arranged two bearings 507. However, regarding the two bearings to hold the flange 509 therebetween, the flange 509 does not necessarily have to be held between the coaxially arranged two bearings, as long as it is pressed in opposite (countering) directions in the axial direction to reduce the backlash in the thrust direction.

An example in which the flange 509 is held between two bearings that are not coaxially arranged will be described.

Figure 8A:
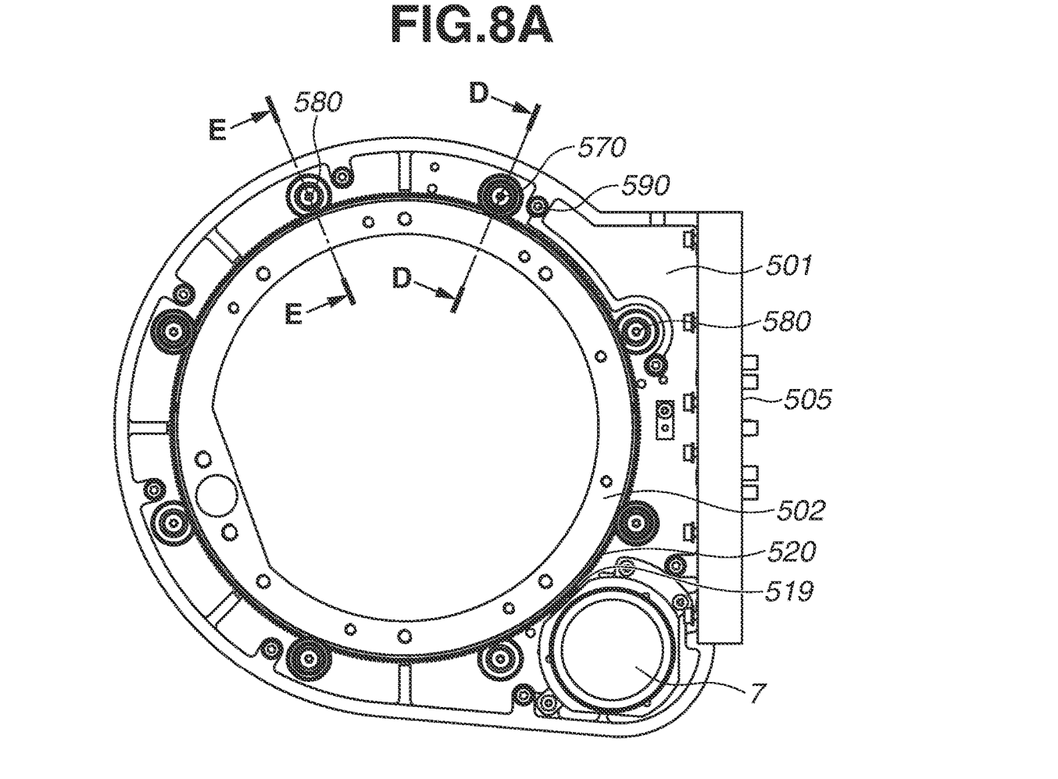
FIG. 8A illustrates the rotator according to an example modification as viewed from the back surface.
Figure 8B:
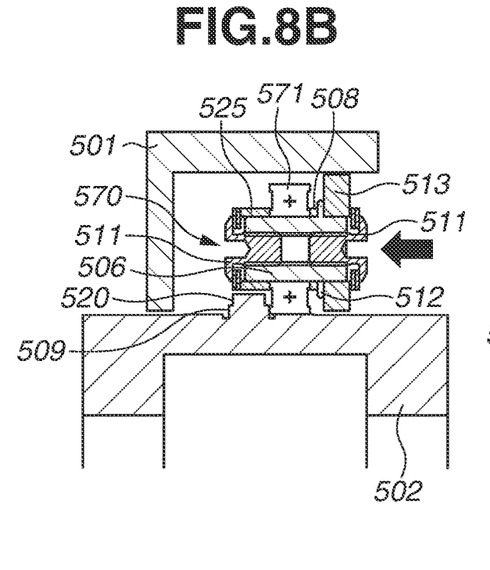
FIG. 8B is a cross-sectional view of the rotator according to the example modification.
Figure 8C:
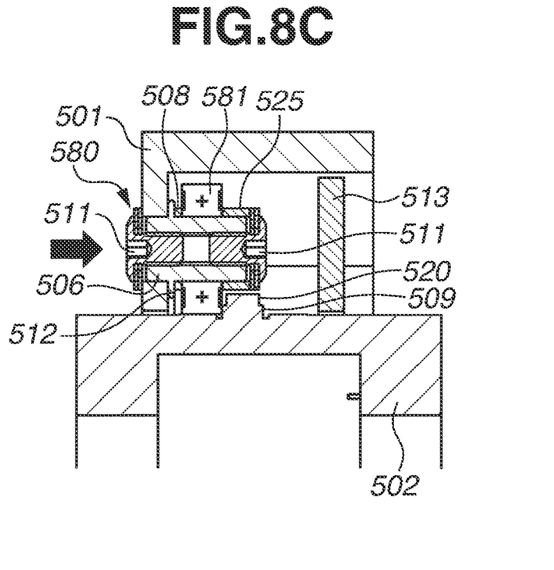
FIG. 8C is a cross-sectional view of the rotator according to the example modification.

FIG. 8A illustrates the rotator 5 according to a present example modification. FIG. 8B is a cross-sectional view of a bearing unit 570 illustrated in FIG. 8A taken along a line D-D. FIG. 8C is a cross-sectional view of a bearing unit 580 illustrated in FIG. 8A taken along a line E-E.

The bearing unit (a first rotational unit) 570 is provided in a form of including only one bearing of the two bearings 507 in the bearing unit 503 according to the first example embodiment illustrated in FIGS. 5A to 5D. The one bearing included in the bearing unit 570 will be referred to as a bearing 571. The bearing unit (a second rotational unit) 580 disposed adjacent to the bearing unit 570 is provided in a form of including only a bearing located in a direction opposite to the above-described one bearing in the two bearing units 503 according to the first example embodiment. The one bearing included in the bearing unit 580 will be referred to as a bearing 581.

In the description, the bearing 571 will be referred to as one bearing 571, and the bearing 581 will be referred to as the other bearing 581.

The first pressing unit (the screw) 511 according to the present example modification fixes the shaft 506 to the frame 501 to rotatably fix each of the bearing units 570 and 580 to the frame 501. In the present example modification, each of the bearing units 570 and 580 includes a cap 525. Other members are similar to those of the rotator 5 according to the present example embodiment illustrated in FIGS. 5A to 5D, and therefore descriptions thereof will be partially omitted below.

How the flange (the protrusion portion) 509 is held according to the present example modification will be described now.

In FIG. 8B, the one bearing 571 is pressed in an axial direction indicated by an arrow in the drawing as a result of fastening with a screw (a second pressing unit) 590, which fixes the cover 513 to the frame 501, and a pressing force is applied to the one bearing 571 from the screw 590. In FIG. 8C, a pressure is generated as a reaction force to the pressing of the screw 590, and the pressure is applied to the other bearing 581 in an axial direction indicated by an arrow in the drawing (an axial direction opposite to that illustrated in FIG. 8B).

At this time, the flange 509 is held by the pressures in opposite (countering) directions in the axial direction that are applied from the one bearing 571 to which the pressing force of the screw 590 is applied and the other bearing 581 to which the pressure in reaction to the pressing of the screw 590 is applied.

The present configuration allows the rotator 5 to reduce the backlash in the thrust direction due to the rotation of the rotator 5.

The bearings 571 and 581 may be biased by a pressure of another pressing unit different from the pressing unit according to the above-described example modification to hold the flange 509. In the present example embodiment, it is desirable to apply the pressing force with the aid of the fastening with the screw 590 fixing the cover 513 to the frame 501.

In addition, curved surfaces of outer peripheral surfaces of the two bearings, the one bearing 571 and the other bearing 581, are in contact with the inner ring 502.

The spacers (the adjustment unit) 508 are held between the one bearing 571 and the flange 512 and between the other bearing 581 and the flange 512. A space in the rotational axis direction between the one bearing 571 and the other bearing 581 opposite from each other is adjusted with the spacers 508 to fall below the length of the flange 509 in the rotational axis direction. The lengths of the spacers 508 are adjusted to allow a difference between the lengths of the space and the flange 509 in the rotational axis direction to fall within a range that does not exceed a thrust backlash amount with respect to the inner races 5071 (the outer races 5072) of the one bearing 571 and the other bearing 581 when the bearing outer races 5072 (the inner races 5071) are held. In the present example modification, the lengths of the spacers 508 in the rotational axis direction are shorter than the length of the flange 509 in the rotational axis direction. In this case, application of an excessive axial force to the one bearing 571 and the other bearing 581 is avoided.

The sliding washers (the wear reduction unit) 518 in the present example modification are disposed between the bearing 571 and the flange 509 and the bearing 581 and the flange 509. The flange 509 is held between the sliding washers 518 to which the pressures are applied.

Owing to the above-described configuration, the rotator 5 can reduce friction between surfaces of the one bearing 571 and the other bearing 581 that hold the flange 509 and surfaces of the flange 509 held by the bearings 571 and 581, to avoid the operational failure due to the sliding wear.

Having described the example embodiments of the present disclosure, the present disclosure is not limited to these example embodiments and can be modified and changed in various manners within the range of the spirit thereof.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Applications No. 2018-205867, filed Oct. 31, 2018, and No. 2019-169245, filed Sep. 18, 2019, which are hereby incorporated by reference herein in their entirety.

What is claimed is:

1. A rotational mechanism comprising:
a frame;
a plurality of rotational units;
an inner ring rotatably supported on the frame via the plurality of rotational units; and
a rotation driving unit configured to generate power for rotating the inner ring,
wherein the inner ring is provided with a protrusion portion on an outer periphery,
wherein each of the plurality of rotational units includes a first bearing, a second bearing, a first pressing unit, the first pressing unit being configured to apply pressing forces to the first bearing and the second bearing in an opposite direction to a rotational axis direction of the inner ring, and an adjustment unit between a first surface which is on a second bearing side of the first bearing and a second surface which is on a first bearing side of the second bearing,
wherein the protrusion portion is held between the first surface and the second surface for each of the plurality of rotational units due to the pressing forces, and
wherein a length of the adjustment unit in the rotational axis direction is shorter than a length of the protrusion portion in the rotational axis direction between the first surface and the second surface.

2. The rotational mechanism according to claim 1, wherein a difference between the lengths of the adjustment unit and the protrusion portion in the rotational axis direction falls within a range that does not exceed a thrust backlash amount with respect to inner races or outer races of the first and second bearings.

3. The rotational mechanism according to claim 1, wherein the plurality of rotational units is disposed along a circumference on the outer periphery of the inner ring.

4. The rotational mechanism according to claim 1, wherein the power generated by the rotation driving unit is transmitted to a second power transmission mechanism provided at the protrusion portion via a first power transmission mechanism connected to the rotation driving unit and configured to transmit the power, and the inner ring rotatably supported by the rotational units is rotated.

5. The rotational mechanism according to claim 1, wherein curved surfaces of each of the first bearing and the second bearing are in contact with the inner ring.

6. The rotational mechanism according to claim 1, wherein each of the rotational units includes wear reduction units configured to reduce sliding wear generated due to a rotation of the inner ring between surfaces of the protrusion portion held between the first bearing and the second bearing and the respective first and second surfaces,
wherein the wear reduction unit is units are respectively disposed between the first bearing and the adjustment unit and between the second bearing and the adjustment unit, and
wherein the protrusion portion is held by the wear reduction units.

7. A rotational mechanism comprising:
a frame;
a plurality of first rotational units;
a plurality of second rotational units;
an inner ring rotatably supported on the frame via the plurality of the first rotational units and the plurality of the second rotational unit;
a rotation driving unit configured to generate power for rotating the inner ring; and
a first pressing unit configured to apply a pressing force in a rotational axis direction of the inner ring,
wherein the inner race is provided with a protrusion portion on an outer periphery,
wherein each of the plurality of the first rotational units includes one bearing,
wherein each of the plurality of the second rotational units includes one bearing, and
wherein the rotational mechanism comprises a plurality of configurations in each of which the protrusion portion is held in the rotational axis direction by a first bearing, to which a pressing force in the rotational axis direction is applied, of a first rotational unit among the plurality of the first rotational units and a second bearing, to which a reaction force in reaction to the pressing force is applied, of a second rotational unit among the plurality of the second rotational units which is disposed adjacent to the first rotational unit.

8. The rotational mechanism according to claim 7, wherein a distance in the rotational axis direction between the one bearing of the first rotational unit and the one bearing of the second rotational unit is shorter than a length of the protrusion portion in the rotational axis direction.

9. The rotational mechanism according to claim 8, wherein a difference between the distance between the first bearing of the first rotational unit and the second bearing of the second rotational unit in the rotational axis direction and the length of the protrusion portion in the rotational axis direction falls within a range that does not exceed a thrust backlash amount with respect to inner races or outer races of the first bearing and the second bearing.

10. The rotational mechanism according to claim 7, wherein the power generated by the rotation driving unit is transmitted to a second power transmission mechanism provided at the protrusion portion via a first power transmission mechanism connected to the rotation driving unit and configured to transmit the power, and the inner ring rotatably supported by the rotational units is rotated.

11. The rotational mechanism according to claim 7, wherein curved surfaces of the first bearing and the second bearing are in contact with the inner ring.

12. The rotational mechanism according to claim 7, wherein the first rotational unit includes a wear reduction unit configured to reduce sliding wear generated due to a rotation of the inner ring between the first bearing and the protrusion portion, and the second rotational unit includes a wear reduction unit configured to reduce sliding wear generated due to the rotation of the inner ring between the second bearing and the protrusion portion, and
wherein the protrusion portion is held between the two wear reduction units.

13. The rotational mechanism according to claim 7, wherein
a plurality of configurations in which the protrusion portion is held by the first bearing to which a pressing force in the rotational direction is applied and the second bearing to which a reaction force in reaction to the pressing force are disposed along a circumference on an outer periphery of the inner ring.

14. A camera platform system comprising:
a camera stand on which an imaging device is mountable;
a rotational mechanism configured to allow the camera stand to rotate, the rotational mechanism comprising:
a frame;
a plurality of rotational units;
an inner ring rotatably supported on the frame via the plurality of rotational units; and
a rotation driving unit configured to generate power for rotating the inner ring,
wherein the inner ring is provided with a protrusion portion on an outer periphery,
wherein each of the plurality of rotational units includes a first bearing, a second bearing, a first pressing unit, the first pressing unit being configured to apply pressing forces to the first bearing and the second bearing in an opposite direction to a rotational axis direction of the inner ring, and an adjustment unit between a first surface on a second bearing side of the first bearing and a second surface on a first bearing side of the second bearing,
wherein the protrusion portion is held between the first surface of the first bearing and the second surface of the second bearing for each of the plurality of rotational units due to the pressing forces,
wherein a length of the adjustment unit in the rotational axis direction is shorter than a length of the protrusion portion in the rotational axis direction between the first surface and the second surface, and
wherein a camera platform to which the rotational mechanism is connected and which is configured to rotate the camera stand around an axis in a first direction perpendicular to a rotational axis of the rotational mechanism and around an axis in a second direction perpendicular to the rotational axis and the first direction.

15. A camera platform system comprising:
a camera stand on which an imaging device is mountable;
a rotational mechanism configured to allow the camera stand to rotate, the rotational mechanism comprising:
a frame;
a plurality of rotational units;

an inner ring rotatably supported on the frame via the plurality of rotational units;

a rotation driving unit configured to generate power for rotating the inner ring; and a first pressing unit configured to apply a pressing force in a rotational axis direction of the inner ring, wherein the inner race is provided with a protrusion portion on an outer periphery, wherein each of the plurality of rotational units includes one bearing, wherein the protrusion portion is held between a first bearing of a first rotational unit to which the pressing force is applied and a second bearing of a second rotational unit to which a reaction force is applied and disposed adjacent to the first rotational unit due to the pressing force and the reaction force in reaction to the pressing force, and wherein a camera platform to which the rotational mechanism is connected and which is configured to rotate the camera stand around an axis in a first direction perpendicular to a rotational axis of the rotational mechanism and around an axis in a second direction perpendicular to the rotational axis and the first direction.

* * * * *